United States Patent
Emigh et al.

(10) Patent No.: US 7,330,112 B1
(45) Date of Patent: Feb. 12, 2008

(54) LOCATION-AWARE SERVICES

(76) Inventors: Aaron T. Emigh, 762 Judith Ct., Incline Village, NV (US) 89451; James A. Roskind, 920 Governors Bay Dr., Redwood City, CA (US) 94065

( * ) Notice: Subject to any disclaimer, the term of this patent is extended or adjusted under 35 U.S.C. 154(b) by 201 days.

(21) Appl. No.: 10/937,920

(22) Filed: Sep. 9, 2004

Related U.S. Application Data

(60) Provisional application No. 60/501,691, filed on Sep. 9, 2003.

(51) Int. Cl.
*G08B 1/08* (2006.01)

(52) U.S. Cl. .......................... 340/539.13; 340/539.16; 340/933; 340/941; 340/429; 340/436; 340/572.1; 340/572.4

(58) Field of Classification Search ........... 340/539.13, 340/539.16, 933, 941, 429, 438, 572.1, 572.4, 340/572
See application file for complete search history.

(56) References Cited

U.S. PATENT DOCUMENTS

| | | | | |
|---|---|---|---|---|
| 5,661,473 | A | * | 8/1997 | Paschal .................. 340/825.36 |
| 5,801,618 | A | * | 9/1998 | Jenkins ................... 340/426.14 |
| 6,081,206 | A | * | 6/2000 | Kielland .................... 340/937 |
| 2004/0210757 | A1 | * | 10/2004 | Kogan et al. ............... 713/182 |

* cited by examiner

*Primary Examiner*—Tai Nguyen

(57) ABSTRACT

In some embodiments, a technique for providing location-based functionality comprises providing functionality, wherein the functionality uses information provided by a location-aware device.

8 Claims, 14 Drawing Sheets

LOCATION-AWARE SERVICES

CROSS REFERENCE TO RELATED APPLICATIONS

This application claims priority to U.S. Provisional Patent Application No. 60/501,691 entitled LOCATION-BASED SERVICES, filed Sep. 9, 2003, which is incorporated herein by reference for all purposes.

FIELD OF THE INVENTION

The present invention relates generally to the areas of computer software and portable electronics, more specifically to the area of location-aware devices.

BACKGROUND OF THE INVENTION

Technology for determining location has become small and inexpensive, facilitating the creation of location-aware devices. However, current location-aware devices provide limited functions.

It would be useful to have increased functionality for location-aware devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
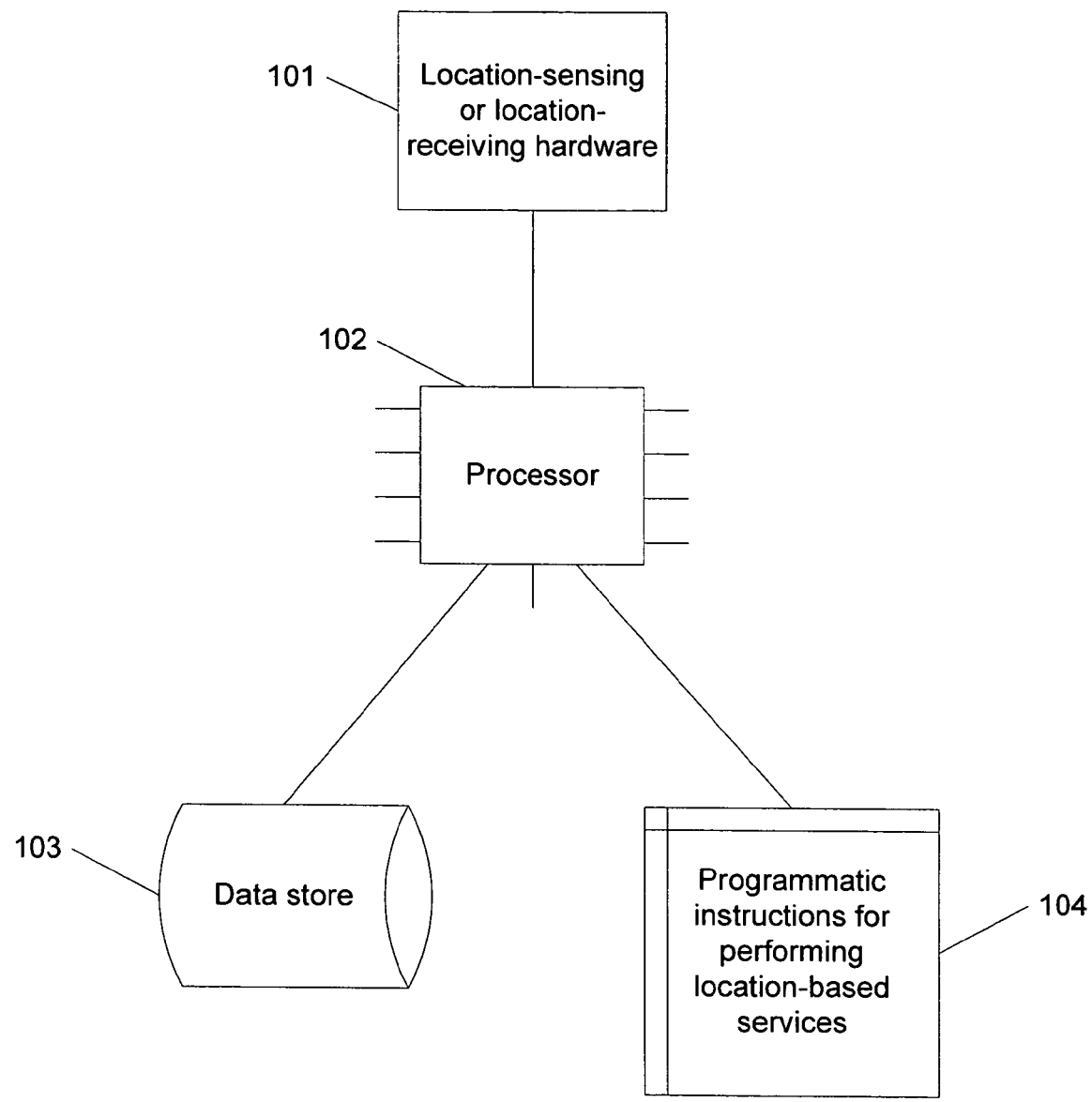
FIG. 1 is an illustrative diagram of a system for performing location-based services according to some embodiments.

FIG. 1 is an illustrative diagram of a system for performing location-based services according to some embodiments. In this example, hardware capable of sensing a location or receiving location information 101 may be connected to a processor capable of executing instructions to perform location-based services 102. Examples of hardware capable of sensing a location include a GPS receiver, and one or more accelerometers or gyroscopes. An example of hardware capable of receiving location information is an interface capable of connecting to a network over which location information may be transmitted, for example a wireless network such as 802.11, GPRS or Bluetooth.

A data store 103 is shown to be connected to the processor 102. A data store may be any medium capable of storing data, for example read-only memory, magnetic or optical storage, non-volatile electronic memory such as flash memory, or battery-powered electronic memory such as DRAM.

Programmatic instructions for performing location-based services 104 may be made available to the processor 102. Examples of media in which programmatic instructions for performing location-based services may be contained include read-only memory, magnetic or optical storage, and random-access memory such as DRAM or flash memory.

Figure 2:
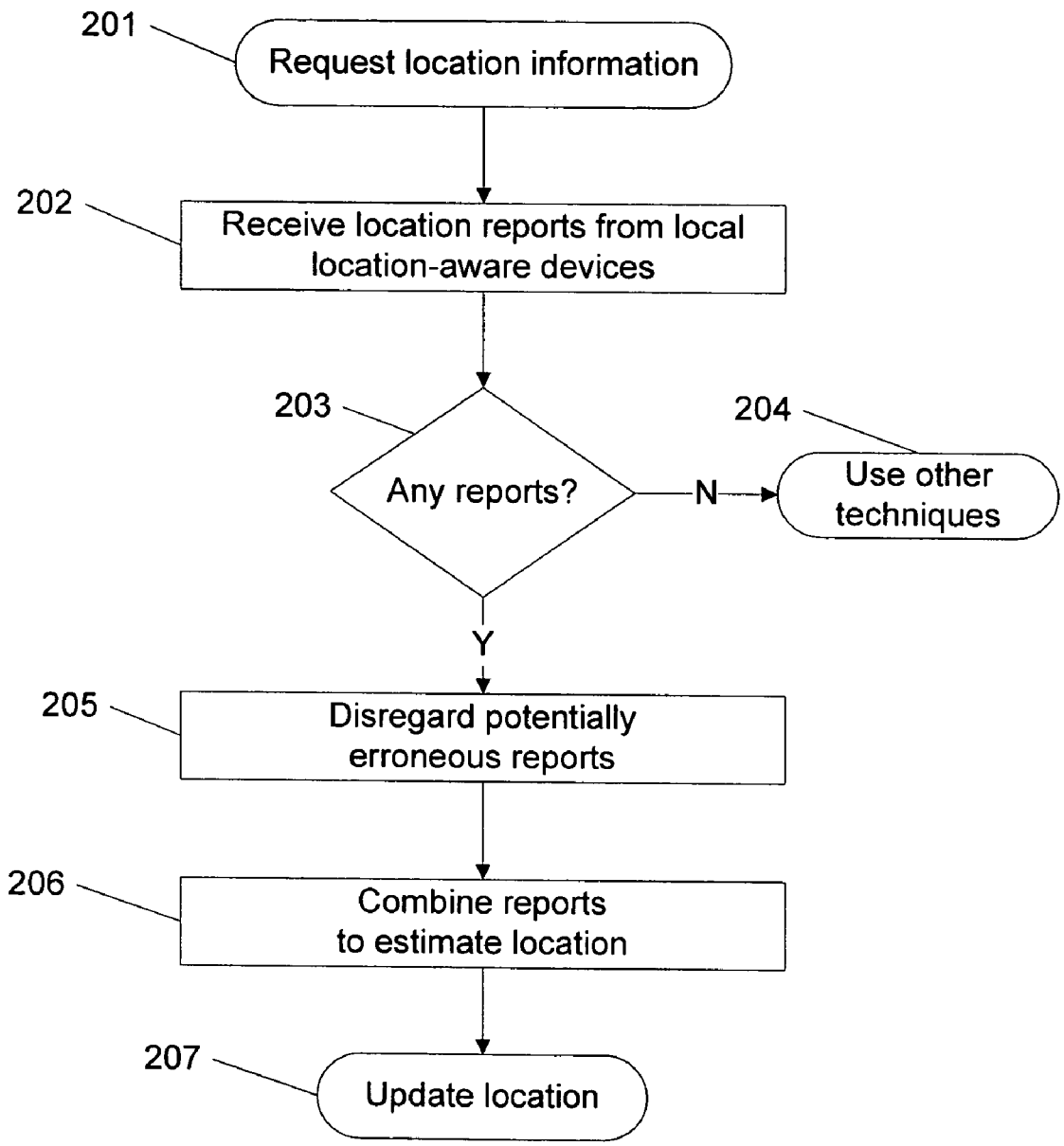
FIG. 2 is a flow diagram of a method for obtaining location information from one or more location-aware peer devices according to some embodiments.

FIG. 2 is a flow diagram of a method for obtaining location information from one or more location-aware peer devices according to some embodiments. A "location-aware device" or "LAD" refers herein to any device that can be aware of its location, either directly or indirectly. Examples of LADs include a personal digital assistant which has the capability to communicate with Global Positioning System (GPS) satellites (for example, an HP iPaq 5555 with a Pharos PF022 card, a Handspring Visor with a Magellan GPS Companion module, or a Garmin iQue 3600), an automotive navigation unit such as a Siemens IDIS or TetraStar (as used in BMW and Mercedes automobiles), and a cellular telephone capable of receiving location information. Examples of ways in which a LAD can be made aware of its location include satellite-based services such as GPS, accelerometers, gyroscopes, local transmissions from fixed or mobile locations, manual input by a user, and receiving location information from another LAD. In some embodiments, a LAD may make location information programmatically available to software running on it, for example via the National Marine Electronics Association standard NMEA-0183.

In this example, location information may be requested (201). For example, a request may be transmitted (for example using a broadcast) over a communications network such as a wireless network. Examples of wireless networks include 802.11 and Bluetooth. In some embodiments, a request may be implicit. One example of an implicit request is not making a request. Another example of an implicit request is another communication, for example a broadcast indicating the presence of a device, which may be taken as an implicit request for location information. One or more location reports may be received from local location-aware devices (202). A location report refers herein to a communication containing a location of the device sending the report, for example in latitude and longitude. In some embodiments, a reporting device may have measured its own location, for example using location-sensing hardware such as a GPS receiver. In some embodiments, a reporting device may have determined its location from location reports received from other entities. In some embodiments, a device providing a report may be a peer of a requesting device, for example a mobile device such as a PDA, cellular phone or automotive navigational system. An example of receiving one or more location reports is to receive them over a network medium through which a request was transmitted, for example a wireless network such as Bluetooth or 802.11, or using a mode of transmission specified in a request.

It may be determined whether a location report has been received (203). If a location report has not been received (203), then other techniques are used in this example (204). Examples of other techniques include invalidating any location awareness until a location can be ascertained, using the last known location, and extrapolating from the last known location.

If a location report has been received (203), then one or more potentially erroneous location reports are optionally disregarded in some embodiments (205). An example of disregarding a location report is to not include the location report in a location calculation. An example of disregarding potentially erroneous location reports is to disregard reports containing locations that are substantially different than average. In one example of disregarding locations substantially different than average, one or more location reports that contain a location more than a threshold distance from the average reported location, for example a hundred meters, may be disregarded. In some embodiments, one or more location reports containing locations more than a threshold distance from the average reported location may be disregarded when at least a threshold number of reports, for example two, are received containing distances within the threshold distance from the average. In another example of disregarding locations substantially different than average, one or more reports that are furthest from the average may be disregarded based on a fixed or variable ratio, such as ignoring the 10% of reports furthest from the average location, or any report varying from the average by more than 10%. In another example of disregarding locations substantially different than average, one or more reports that are furthest from the average may be disregarded based on a statistical measure such as disregarding any locations greater than some threshold number of standard deviations (for example two) from average. In some embodiments, location(s) substantially different than average may be disregarded when more than a threshold number of location reports have been received, for example three. In some embodiments, disregarding locations substantially different than average may be required to eliminate at least a predetermined number of reports, for example one. In some embodiments, one or more X and/or Y coordinates within location reports may be separately disregarded, for example an X or Y coordinate substantially different than average. Any technique discussed above for disregarding reports substantially different than average may be applied separately to X and Y coordinates.

Location reports may be combined to estimate the current location (206). One example of combining location reports is to average location reports received from location-aware devices. In some embodiments, averaging reports may include calculating an arithmetic mean. In some embodiments, averaging reports may include calculating a median. In some embodiments, averaging reports may include calculating a mode. In some embodiments, an average may be weighted by the observed signal strength from each reporting device. Another example of combining location reports is to use both a received location report and the direction from which the location report signal arrived. A direction from which a location report signal originates may, for example, be obtained from a Doppler direction finder, or from an effectively rotating directional beacon transmission such as is used on aircraft VOR navigational systems, which establishes a radial direction from a transmitter to a receiver. In some embodiments, directions from sources of location reports may be used to triangulate. In one example of triangulation, if radial directions are received from two transmitters, with one transmitter due east and the other due north, then a current location is derived in this example at the latitude of the due east transmitter, and the longitude of the due north transmitter. In another example of triangulation, if radial directions are received from two transmitters of location reports, and the radial directions are not collinear with a receiver, then a unique location for the receiver may be derived using trigonometric methods well known to those skilled in the art. In another example of triangulation, radial directions to three or more transmitters may be acquired, and a receiver location may be estimated when all the radials do not align at a single point In some embodiments, a least squares error estimate of the receiver's position may be derived based on triangulation relative to three or more radials to known or specified locations. In this example, an error metric in an estimate may for example be defined to be the sum of the squares of the distances from the receiver's estimated location to the radial lines.

In some embodiments, X and Y coordinates, such as a latitude and longitude, may be calculated separately from locations reported by locally accessible LADs. In one example of separately calculating X and Y coordinates, average X and Y coordinates may be calculated from the X and Y coordinates contained within location reports.

In some embodiments, a previous location, such as the last known location, may be taken into consideration when evaluating a location in a location report, for example by disregarding reports that are far from the last known location. For example, a new location reading may be analyzed to calculate the distance (for example, the number of miles or degrees) between it and a previous location. If this distance is greater than a threshold, then the location in the location report may be disregarded. In some embodiments, the threshold may be a constant, for example 600 miles. In some embodiments, the amount of time since the previous location was calculated may be taken into account in determining a threshold, for example by multiplying a constant threshold such as 600 miles by the amount of time (for example the number of hours) since the previous location was calculated. In some embodiments, a combination of elapsed time and a distance threshold may be expressed as a speed threshold, for example 600 miles per hour in the example above. In some embodiments, a time threshold may be combined with a distance threshold, including a combination of elapsed time and distance threshold, for example by applying the distance threshold only for location reports received less than a threshold period of time, such as five hours, since the last location report. In some embodiments, when multiple consistent location reports beyond a threshold are received, the location may be accepted.

When one or more location reports have been combined and/or disregarded (205), the location is updated in this example (206).

Figure 3:
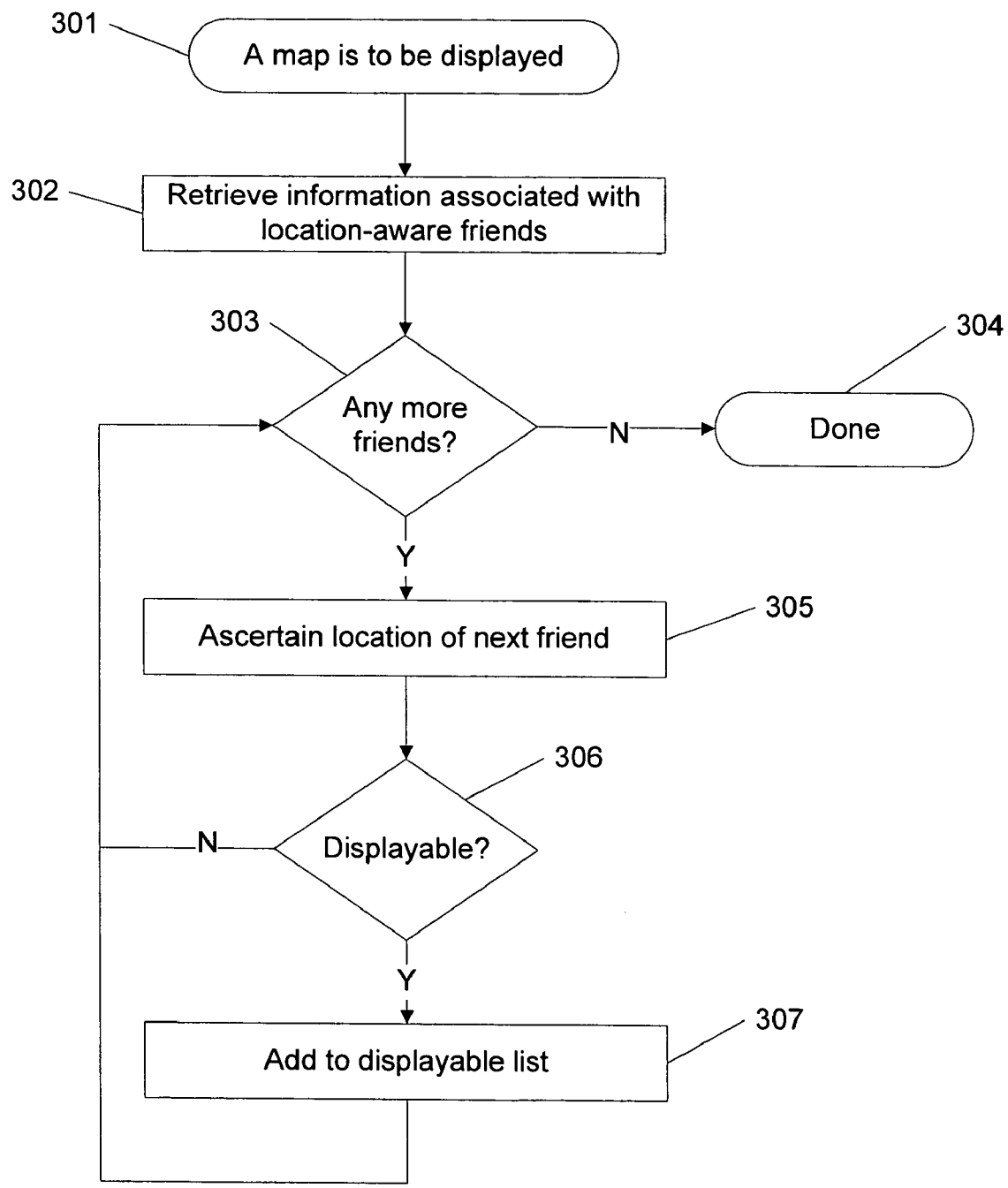
FIG. 3 is a flow diagram of a method for displaying location-aware friends according to some embodiments.

FIG. 3 is a flow diagram of a method for displaying location-aware friends according to some embodiments. In this example, a map is to be displayed (301), for example because a user has changed location, or has elected to view a map of a particular area, or has requested to view a map displaying the location of one or more friends. An example of a situation in which a map showing friends could be displayed is for a user to select a UI element labeled "My friends," which could translate into a request to display, on the map, all people close to the user's present location (for example, within ten miles) who had previously been classified as friends. Information associated with set of location-aware "friends" may be retrieved (302). A "friend" refers herein to any person that has been classified as an entity to monitor, who has given permission for such monitoring, either implicitly or explicitly. In some embodiments, a friend may be classified as such by explicit classification by the user, proactively or in response to a request by the friend. In some embodiments, a friend may be classified as such by automatic techniques including identification of associates in the user's address book, calendar, instant messaging "buddy list," or other user data. In some embodiments, a friend may give implicit monitoring permission to a watcher by possessing data associating the friend with the watcher, for example by having the watcher in his or her address book, calendar, instant messaging "buddy list" or other user data. One example of retrieving a set of friends is to retrieve friend data from storage such as a file or database. Another example of retrieving a set of friends is to have friend data ready to access, for example in memory. In some embodiments, friends may be categorized into groups, and an example of retrieving a set of friends is to retrieve a set of friends belonging to a particular group, such as family or coworkers.

When no more friends remain to be evaluated (303), generation of the displayable list of friends is complete in this example (304). One example of an action to take when the list is complete is to display the location of friends. Another example of an action to take when the list is complete is to provide the list through a programmatic interface. If another friend remains to be evaluated (303), then his or her location may be ascertained (305).

In some embodiments, the locations of a plurality of friends may be ascertained individually. In some embodiments, the locations of a plurality of friends may be ascertained simultaneously.

Figure 4:
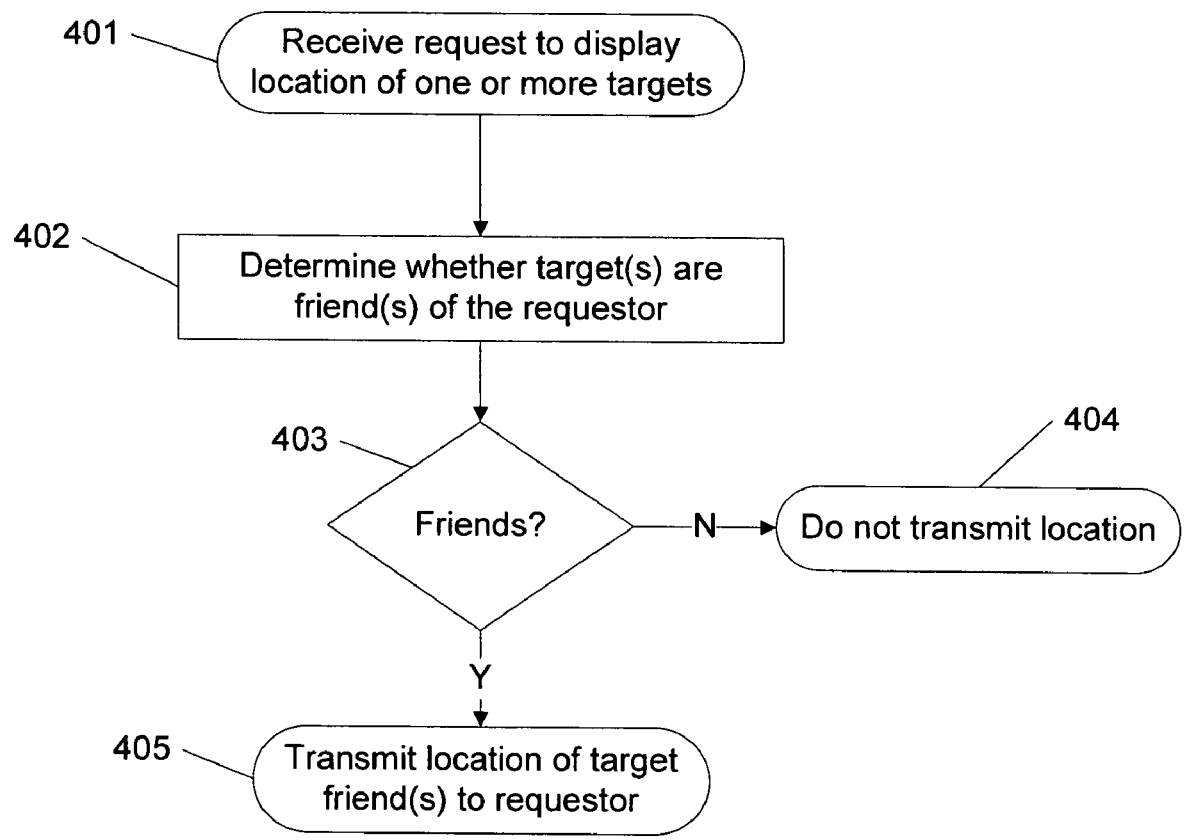
FIG. 4 is a flow diagram of a method for responding to a request to provide the locations of one or more friends.

One example of ascertaining the location of a friend is to query a server, as discussed in conjunction with FIG. 4. Another example of ascertaining the location of a friend is to obtain the location from a peer, for example via a peer-to-peer protocol. Another example of ascertaining the location of a friend is to receive a direct location transmission from the friend. In an example of a direct location transmission from a friend, a cellular telephone may receive location information directly from another cellular telephone, for example a telephone with whom a connection such as a phone call is established. Such transmission may, for example, be effected by encoding location information along with digitized voice data.

It may be determined whether the friend is displayable (306). In some embodiments, determining whether the friend is displayable may include determining whether the friend's location is within the boundaries of a map. In some embodiments, for example when a map showing the location (s) of one or more friends has been requested, determining whether a friend is displayable may include setting or expanding boundaries of a map to include the location of the friend.

If the friend being evaluated is not displayable (306), then the next friend is evaluated in this example (303). If the friend being evaluated is displayable, for example because the friend is in a displayable area or a request has been made to display the location of the friend (306), then the friend is added to a displayable list in this example (307). One example of adding a friend to a displayable list is to display the friend on a map. Another example of adding a friend to a displayable list is to add information about the friend, such as the identity and location of the friend, to a list of items to be displayed later, for example when the map is rendered. The next friend may be evaluated (303).

In some embodiments, a friend may be a child equipped with a tracking device. An example of a tracking device is a device incorporating a Radio Frequency Identification (RFID) tag such as an Alien Technology 2450 MHz Long Range Backscatter RFID System. In some embodiments, a tracking device may be incorporated into a friend's personal effects such as his or her shoes. In some embodiments, a tracking device may be rented, for example at a large public venue such as Disneyland. At the time the tracking device is rented, a key for a cipher such as a symmetric cipher (for example, DES, AES or Blowfish) may be assigned to the tracking device and shared between the tracking device and an approved tracker's LAD, such as a parent's LAD. When a friend, for example a child, passes a gateway or other place where a sensor has been installed, a tracking device associated with the friend may be read and the friend's location may be relayed to an approved tracker's LAD or other map-aware terminal, for example by relaying the location from the reader to a server, which can construct an encrypted message containing an identifier associated with the tracking device and the location at which it was sensed. A message containing a location can be broadcast over a wireless network such as 802.11 by access points throughout the facility, at one of which the user's LAD may receive it. In some embodiments, a LAD in this tracking mode can receive messages and attempt to decrypt them using its assigned key. Any such messages that result, after decryption, in a valid identifier and location may be displayed on a map.

FIG. 4 is a flow diagram of a method for responding to a request to provide the locations of one or more friends. In this example, a request for the location of one or more targets represented as friends is received (401). An example of a request for more than one target is a communication of a form such as <REQUEST_ALL_FRIENDS, userID, latitude, longitude, radius>, where REQUEST_ALL_FRIENDS is the command to return the locations of nearby friends, userID is the user ID of the user whose friends are being sought, latitude and longitude are the coordinates of the center of the area in which location information for friends is requested, and radius is the radius around that center in which the search should be conducted. An example of a request for the location of a single target is a communication of a form such as <REQUEST_FRIEND, friendID>, where REQUEST_FRIEND is an identifier for the command to locate a particular friend and friendID is an identifier associated with that friend.

In some embodiments, it may be determined whether the specified target(s) are actually friends of the requestor (402). An example of determining whether a target is a friend of a requestor is to query a database containing friend associations to determine whether a record exists associating the requestor and the target. If the target is not a friend of the requestor (403), then the location of the target is not transmitted in this example (404). One example of not transmitting the location of a target is to not transmit the location of any targets. Another example of not transmitting the location of a target is to omit a target that is not a friend from a transmitted response containing the locations of one or more other targets that are friends of the requestor.

If the target(s) are friend(s) of the requestor (403), then the location of one or more friends may be transmitted to the requester (405). An example of a response containing the locations of one or more friends is a response containing a list of entries, for example in the form <REPORT_LOCATION, friendID, latitude, longitude>, where REPORT_LOCATION is an identifier for the type of data (a location report), friendID is the unique identifier for a friend and latitude and longitude are the location of that friend. An example of a response containing the location of a single friend is a response containing a single entry, for example in the form <REPORT_LOCATION, friendID, latitude, longitude> as previously described.

In some embodiments, the location of a friend provided in a response may have been received from a LAD associated with the friend. For example, a location may be received and stored, then retrieved when a request for the location is fulfilled. An example of receiving a location from a LAD is to receive a message in a form such as <UPDATE_LOCATION, userID, latitude, longitude>, where UPDATE_LOCATION is an identifier for the command to update a user's location, userID is an identifier associated with the user, and latitude and longitude represent the user's current position. In some embodiments, messages may include proof of the identity of the transmitter, such as a cryptographic signature.

Figure 5:
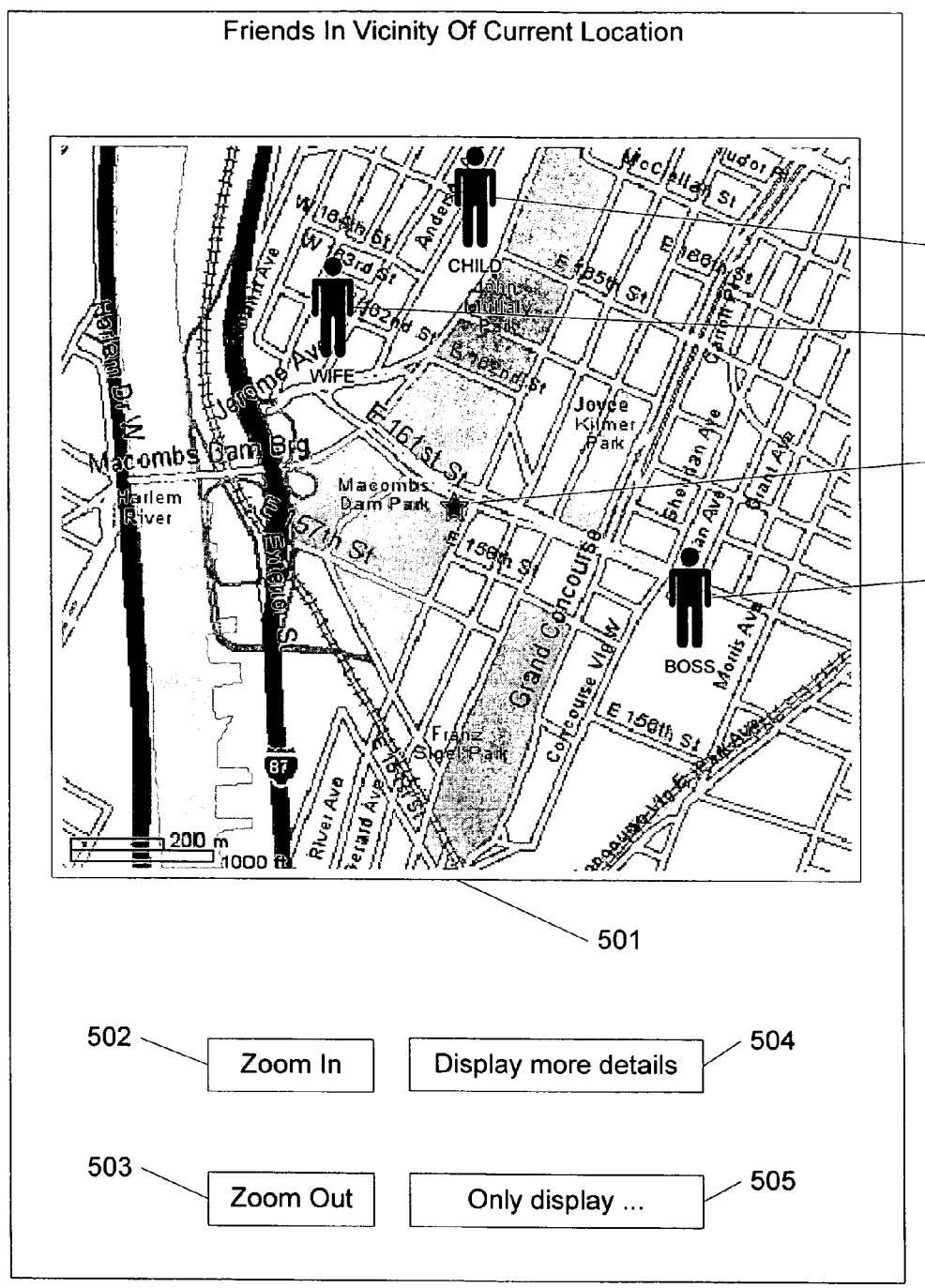
FIG. 5 is an illustrative diagram of a user interface for displaying the location of friends according to some embodiments.

FIG. 5 is an illustrative diagram of a user interface for displaying the location of friends according to some embodiments. An example of a situation in which this user interface could be displayed is when a map including friends has been prepared, for example as discussed in conjunction with 306 of FIG. 3. In this example, a LAD is displaying a map 501 showing the location of a mobile communications device 510 and the location of friends 507, 508, 509, which may for example have been ascertained as discussed in conjunction with 305 of FIG. 3. In this example, friends 507, 508, 509 are labeled "child," "wife" and "boss" respectively, for example because they have been extracted from an electronic address book in which they were stored using these names. In this example, additional information associated with friends 507, 508, 509 may be displayed by selecting a button 504, and a specific group of friends may be selected for display, as discussed in conjunction with 302 of FIG. 6, by selecting a button 505. In this example, the map 501 may be zoomed in or out using buttons 502, 503.

Figure 6:
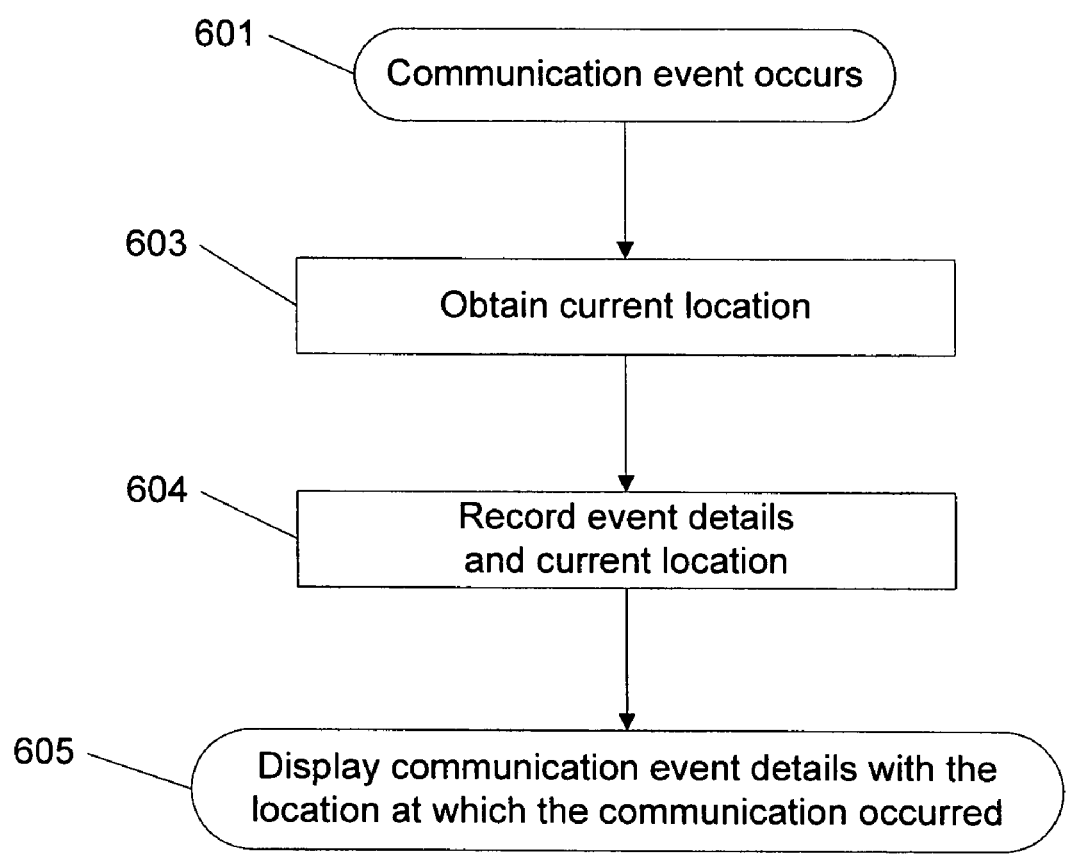
FIG. 6 is a flow diagram of a method for recording and displaying the location of communications by a mobile device.

FIG. 6 is a flow diagram of a method for recording and displaying the location of communications by a mobile device. In this example, a communication event occurs on a mobile communications device (601). An example of a communication event is a telephone call being placed or received. Another example of a communication event is a text message such as an SMS message being sent or received. Another example of a communication event is an email being sent, received or read. An example of a mobile communications device is a telephony-capable or messaging-capable LAD. Another example of a mobile communications device is a telephony-capable or messaging-capable device, such as a cellular phone or a portable computer, that is capable of transmitting communication event details to a LAD, for example through a wireless network such as Bluetooth. Another example of a mobile communications device is a telephony-capable or messaging-capable device, such as a cellular telephone or portable computer, that is capable of receiving a current location from a LAD, for example via a point-to-point protocol such as Bluetooth or as described in conjunction with FIG. 2.

The current location is obtained (602). An example of obtaining the current location is to get the location from location-sensing hardware. Another example of obtaining the current location is to retrieve the current location from storage such as a memory. Another example of obtaining the current location is to receive the current location from a LAD. Event details may be associated with the current location and recorded (604). An example of recording event details and an associated location is to store an indication of the event (which may, for example, include the time, originator, corresponding party identifier such as a telephone number or email address, duration of call, and/or size of message) associated with the current location. In some embodiments, event details and associated location may be stored in a memory such as a magnetic or optical memory, or an electronic memory such as a flash memory.

Communication event details with associated location information may be retrieved and displayed (605). One example of displaying event details with associated location information is to display them when communication is completed. Another example of displaying event details with associated location information is to display them when a user issues a location-based query. An example of a location-based query is for a user who is normally based in San Francisco but travels to Chicago to request a record of calls made during one or more previous trips to Chicago. Another example of displaying event details with associated location information is to display them when a user issues a query that would result in displaying event details, for example when a user views a list of recent calls, or requests a report showing calls made within a certain period of time such as a month. In some embodiments, display may occur on the device that recorded the event details with associated location information. In some embodiments, event details with associated location information may be transmitted to another device, such as a personal computer, which may process queries and/or display event details with associated location information.

Figure 7:
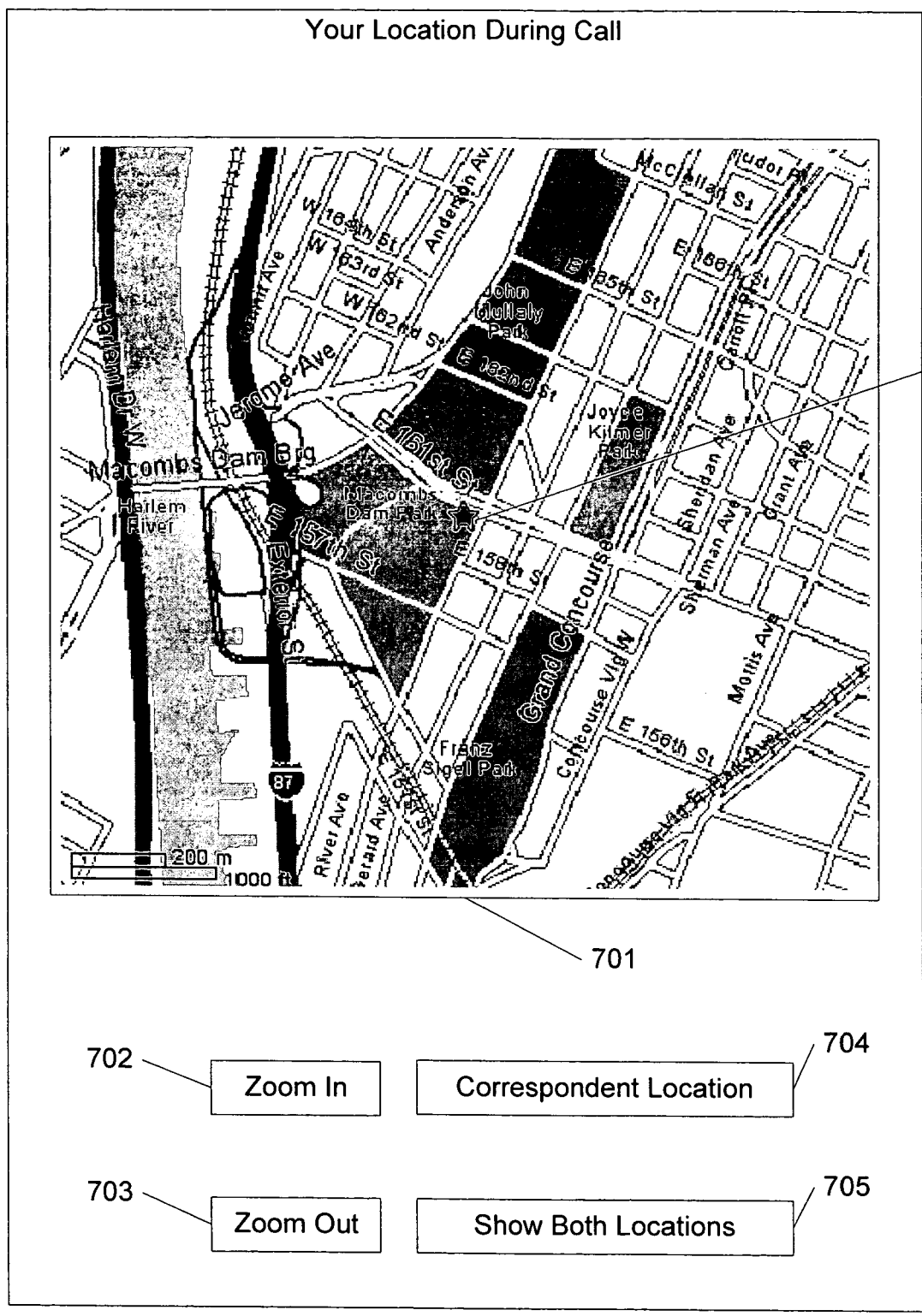
FIG. 7 is an illustrative diagram of a user interface for displaying the location of communications by a mobile device according to some embodiments.

FIG. 7 is an illustrative diagram of a user interface for displaying the location of communications by a mobile device according to some embodiments. An example of a situation in which this user interface could be displayed is when a user has elected to view a log of communications events, for example a call log on a mobile telephony device. In this example, a LAD is displaying a map 701 showing the location of a mobile communications device 706 at the time of a communication event such as a call or receipt of an electronic message. The location of the mobile device may, for example, have been recorded as discussed in conjunction with FIG. 6. In this example, the location of a correspondent is also available, for example because it has been transmitted during a cellular phone call as discussed in conjunction with 305 of FIG. 3. In this example, the correspondent location may be displayed by selecting button 704, and a map displaying both the user and the correspondent's location at the time of the communication event may be displayed by selecting a button 705. In this example, the map 701 may be zoomed in or out using buttons 702, 703.

Figure 8:
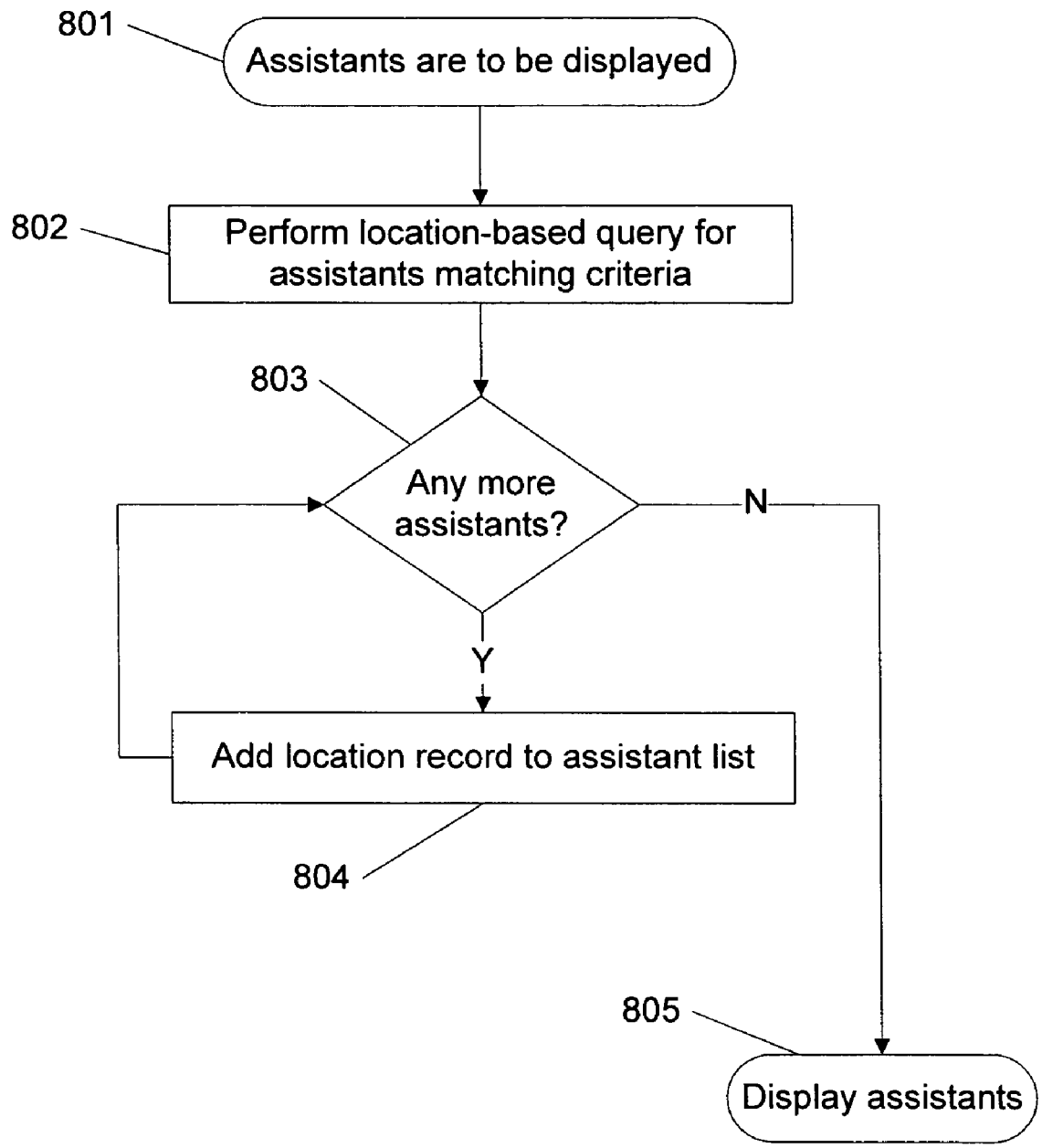
FIG. 8 is a flow diagram of a method for locating potential assistants matching one or more specified criteria according to some embodiments.

FIG. 8 is a flow diagram of a method for locating potential assistants matching one or more specified criteria according to some embodiments. In this example, assistants are to be displayed (801), for example because a user has requested potential assistants matching one or more criteria. An assistant refers herein to a person fitting one or more functional criteria. Examples of assistants include police officers, doctors, firefighters, guides, open cashiers, drivers of available taxis, and technicians. In some embodiments, assistants may include potential social companions, for example potentially compatible members of a dating service. An example of a functional criterion is a category of assistant, for example a doctor, policeman, taxicab driver, etc.

A location-based query for assistants matching criteria may be performed (802). An example of a location-based query is to request one or more assistants in a particular category (such as a doctor) nearest the current location of a user, or another location specified by a user, or a location contained within a map area to be displayed. Another example of a location-based query is to request one or more assistants within a certain region, for example a city, a map area, a neighborhood or a region defined as being within a threshold distance of a location such as the current location of a user or another location specified by a user. Another example of a location-based query is to match nearby dating service members considered potentially compatible based on questionnaires that they had filled out. In this example, if the calculated compatibility is above a certain threshold, the users are shown each other's locations in this example, or one or more of the pair are shown the profile of the other person in this example, optionally including a picture, and given the option to release their location information to that other person.

In some embodiments, a query may be performed through a server. An example of performing a query through a server is for LADs to report their identities and locations to a server, for example as discussed in conjunction with 305 of FIG. 3. When a query is received by a server, the server matches specified criteria against the target location and returns zero or more matching assistants in this example.

In some embodiments, a query may be performed peer-to-peer using a peer-to-peer protocol. An example of a peer-to-peer protocol is to broadcast a query over a network, for example a wireless network such as 802.11 or Bluetooth. A query may contain matching criteria, and optionally a specified area in which an assistant is requested, such as one mile from the requestor's current location. A peer-to-peer query may, for example, be propagated to peers within communications range, along with the initiating LAD's location, one or more matching criteria for the user(s) being sought, a search radius around that location and the propagation path (i.e. sequence of peer-to-peer hops) used to reach the peer. If a receiving peer had already received the message from a different source, or was not within the specified search area, it ignores the message in this example. Otherwise, a receiving peer may broadcast the message to its peers within range, adding its own address to an optional propagation path, and checking to see if its associated user fits the criteria. If its associated user fits the criteria, it optionally offers the option to its user to make him or her visible to the requester in this example. If this request was approved or approval was not required, then its user's location and/or data may be transmitted to the original requestor, for example by transmitting along a propagation path included in the request.

Matching assistants may be collected. If there are no more assistants (803), then collection is complete in this example (805). An example of an action to take when collection is complete is to display all matching assistants, for example on a map. Another example of an action to take when collection is complete is to provide an assistant list through a programmatic interface.

If there are more assistants (803), then the next assistant is added to an assistant list. An example of adding an assistant to an assistant list is to display the assistant, for example on a map. Another example of adding an assistant to an assistant list is to add information associated with the assistant, such as name, location and qualifications, to a list of displayable items. Another example of adding an assistant to an assistant list is to add information about the assistant, such as name, location and qualifications, to a separate list of assistants, which may be displayed later. The next assistant may be processed (803). In some embodiments, obtaining and processing a next assistant (803) may be event-driven, for example by calling a function that processes an assistant when a message is received containing a notification that an assistant matching specified criteria is within a specified area.

Figure 9:
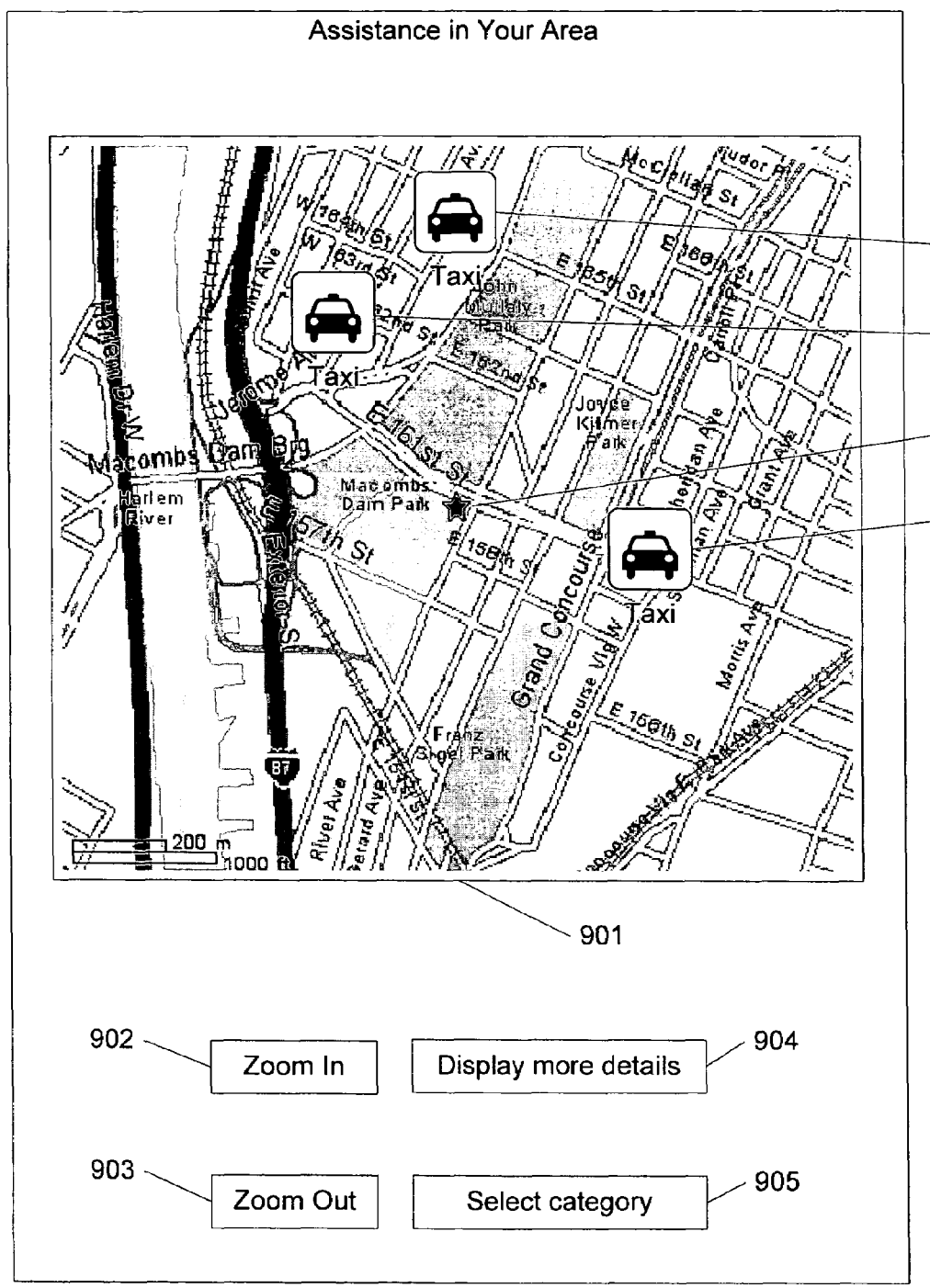
FIG. 9 is an illustrative diagram of a user interface for displaying the location of potential assistants according to some embodiments.

FIG. 9 is an illustrative diagram of a user interface for displaying the location of potential assistants according to some embodiments. An example of a situation in which this user interface could be displayed is when a map including assistants has been prepared, for example as discussed in conjunction with 805 of FIG. 8. In this example, a LAD is displaying a map 901 showing the location of a mobile communications device 910 and the location of potential assistants 907, 908, 909, which may for example have been ascertained as discussed in conjunction with 802 of FIG. 8. In this example, potential assistants 907, 908, 909 are taxicab drivers, for example because the user has selected a functional criterion of taxicab drivers with available cabs, as discussed in conjunction with 802 of FIG. 8. In this example, additional information associated with potential assistants 907, 908, 909 may be displayed by selecting a button 904, and a selection criterion may be changed by selecting a button 905. In this example, the map 901 may be zoomed in or out using buttons 902, 903.

Figure 10:
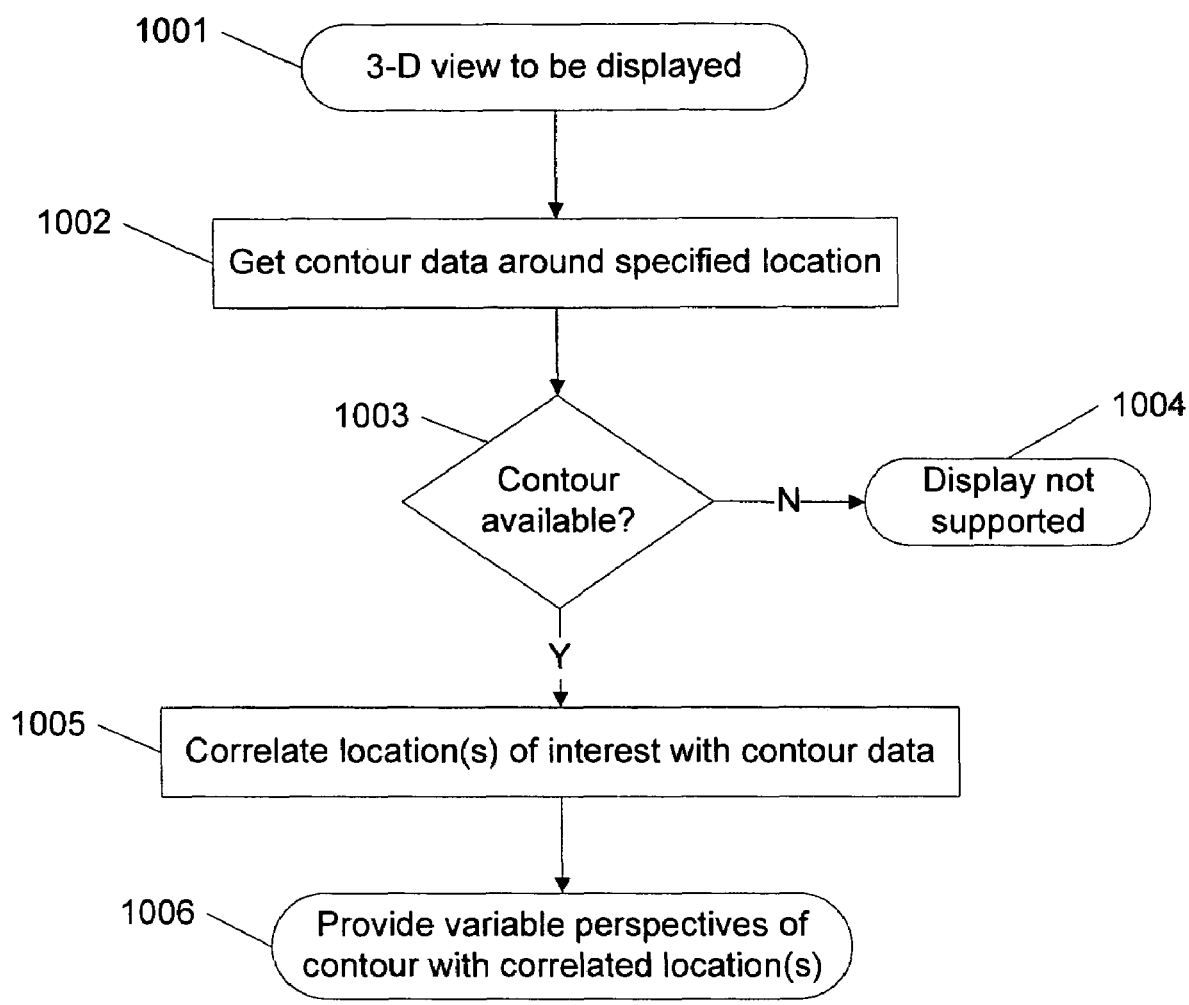
FIG. 10 is a flow diagram of a method for presenting a three-dimensional map with integrated location information according to some embodiments.

FIG. 10 is a flow diagram of a method for presenting a three-dimensional map with integrated location information according to some embodiments. In this example, a three-dimensional view is to be displayed (1001). One example of a reason a three-dimensional view may be displayed is because a user has selected a three-dimensional viewing option. Another example of a reason a three-dimensional view may be displayed is because a LAD has entered a region in which contour data is available. Contour data is obtained around a specified location (1002). One example of a specified location is the current location of the LAD. Another example of a specified location is a location specified by a user. Contour data may be any three-dimensional map data. One example of contour data is a three dimensional object encoded in a renderable format, such as a list of vertices with groupings into polygons that may for example be interpretable by polygon building primitives in a 3-D graphical modeling or rendering system, such as a glVertex* primitive to define a vertex and glBegin and glEnd primitives to define polygons in OpenGL. Details of graphical rendering systems are well known to those skilled in the art. OpenGL is an example of a graphical rendering system, and details of using OpenGL may be obtained from Shreiner, Woo, Neider, Davis and the OpenGL Architecture Review Board, "OpenGL Programming Guide (Fourth Edition)," ISBN 0321173481, which is incorporated herein by reference for all purposes. Another example of contour data is data in a format that may be translated into a renderable format, for example a polygon attribute table, ArcView Shape data, Digital Elevation Model data, or other formats known to those skilled in the art. Another example of contour data is a two-dimensional image of a map containing three-dimensional information, such as a topographical map, which may be converted to a three-dimensional format such as Digital Elevation Model, for example by using a conversion tool such as R2V, available from Able Software.

If contour data is not available for the specified location (1003), then three-dimensional display is not provided in this example (1004). If contour data is available for the specified location (1003), then one or more locations of interest are correlated with the contour data in this example (1005). An example of a location of interest is the specified location, for example the current location of the LAD. Another example of a location of interest is a location of a landmark, such as an airport, restaurant, gas station, etc. Another example of a location of interest is the location of a friend or associate, for example a friend or associate with a LAD that is capable of transmitting its location. Another example of a location of interest is a location specific to the user of a LAD, for example a location corresponding to an address in an electronic address book or a previously visited location. An example of correlating a location of interest with contour data is to insert an image corresponding to a particular location into the contour data at coordinates corresponding to the physical location of the location of interest. Another example of correlating a location of interest with contour data is to insert a partially transparent image corresponding to a particular location into the contour data at coordinates corresponding to the physical location of the location of interest. Another example of correlating a location of interest with contour data is to insert a set of elevated imagery, such as an image of a car or boat, elevated above the contour, at the coordinates corresponding to the physical location of the location of interest. Elevated imagery may for example depict a 3-D icon with an appropriate perspective view of an object, and may optionally cast a shadow on the underlying contour. In some embodiments, an image or icon may be scaled in proportion to scaling of an underlying map or contour. In some embodiments, an image or icon may remain fixed in size while the map or contour scale is changed. In some embodiments, an image or icon may be scaled to different sizes without changing the scaling of the map or contour. In some embodiments, a location of interest may be correlated with contour data as a map associated with the contour data is being generated or displayed. In such embodiments, correlating a location of interest with contour data may include retaining information about the location so it may be integrated with or superimposed on a rendered image associated with the contour data.

One or more scenes of the contour data with integrated location(s) of interest may be provided from one or more perspectives (1006). An example of providing a scene is to render an image corresponding to a projection of contour data with integrated point(s) of interest from a perspective, for example a default perspective, or the last perspective used to view a 3-D scene. In some embodiments, rendering of contour data may be implemented using graphics techniques such as those described in Foley, Van Dam, Feiner and Hughes, "Computer Graphics: Principles and Practice, Second Edition" (ISBN 0-201-12110-7) which is incorporated herein by reference for all purposes. In some embodiments, contour data may be rendered using readily available graphical rendering software such as Direct3D or OpenGL.

In some embodiments, perspective may be modified, for example rotated, moved and/or zoomed in and out. In some embodiments, a user may modify perspective. An example of controls with which a user could modify perspective is by moving a cursor from left to right (rotating the viewpoint around a point, for example the user's current location, horizontally while keeping the vertical orientation constant), or up and down (rotating the viewpoint around a point, for example the user's current location, vertically while keeping the horizontal orientation constant), or both left/right and up/down simultaneously (rotating the viewpoint around a point, for example the user's current location, both horizontally and vertically). In embodiments using OpenGL, perspective may for example be altered using glTranslatef and glRotatef primitives.

Figure 11:
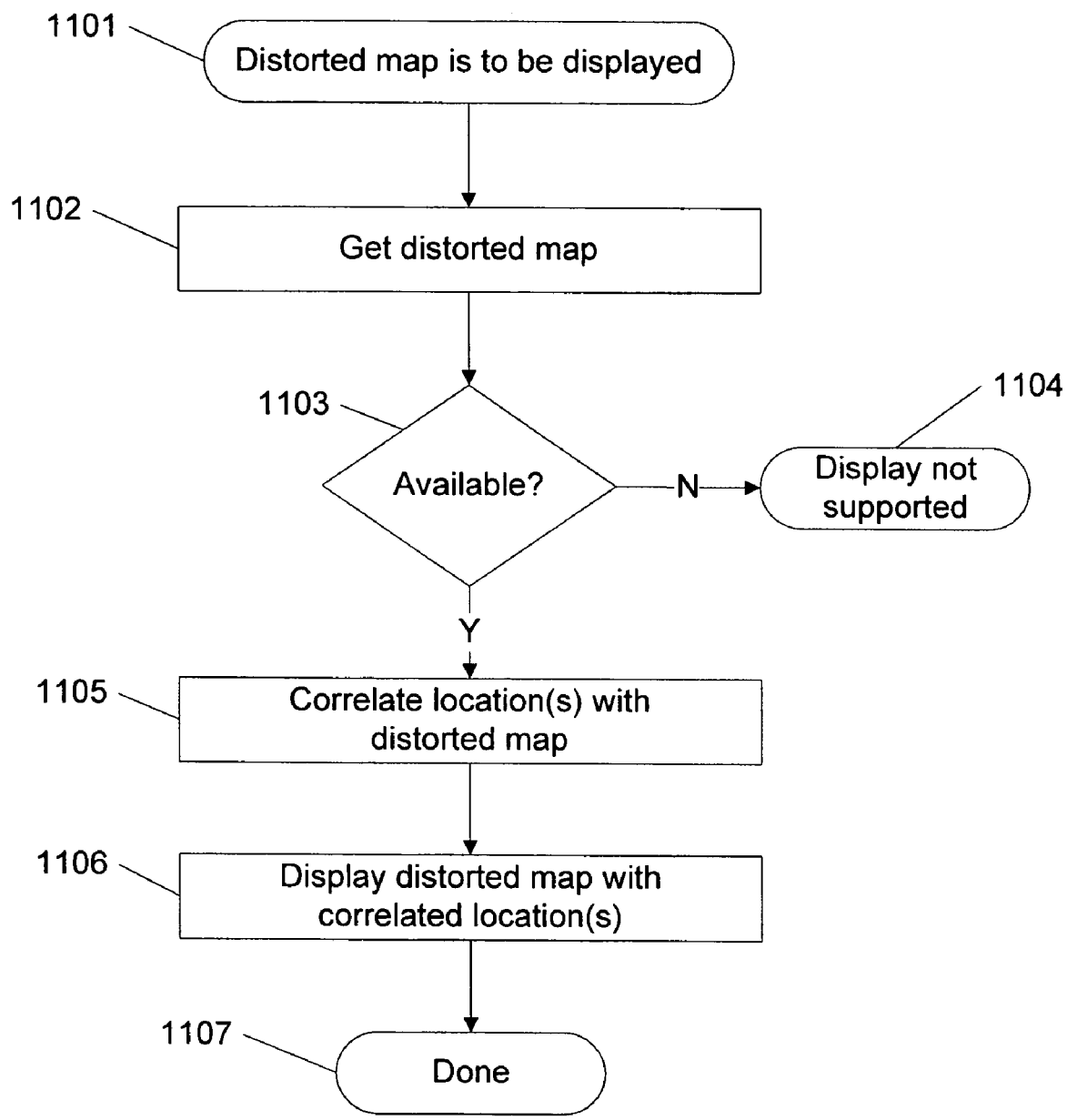
FIG. 11 is a flow diagram of a method for accurately displaying locations on a distorted display according to some embodiments.

FIG. 11 is a flow diagram of a method for accurately displaying locations on a distorted display according to some embodiments. In this example, a distorted map is to be displayed (1101). An example of a situation in which a distorted map is to be displayed is when a user selects an option to display a distorted map, such as a "local map," for example because a local map was available, a LAD prompted the user whether the user wanted to see a local map, and the user answered in the affirmative. Another example of a situation in which a distorted map is to be displayed is when a LAD becomes aware of an available distorted map for a specified location such as the current location, for example because the LAD has been turned on in, or moved into, a region for which a distorted local map is available, or because a location other than the current location has been specified for which a distorted map is available.

A distorted map may be gotten (1102). One example of getting a distorted map is to retrieve it from a memory in an LAD such as a magnetic, optical or electronic memory. Another example of getting a distorted map is to receive it through a communications interface, for example through a network such as a wireless network, for example 802.11 of Bluetooth. For example, a user at a ski area could receive a trail map via an 802.11 wireless network access point near the ticket booth. A "distorted map" refers herein to any map that contains physical locations without spatially corresponding to physical locations in a regular manner. A "distorted map" as used herein includes a map image and associated information specifying points or areas with defined spatial correspondences between map locations and physical locations. An example of a point defining a spatial correspondence between map location and a physical location is a "tiepoint" that maps a point on a distorted map image to a physical location, for example by containing two sets of coordinates, corresponding to the map point and physical location respectively. In some embodiments, a distorted map may be two-dimensional. In some embodiments, a distorted map may be three-dimensional. An example of a distorted map is a map of a ski area, in which trails are rendered with an inconsistent scale, and/or mountains are "unwrapped" to show trails on multiple sides from a single view.

One or more locations of interest may be correlated to the distorted map (1105). An example of a location of interest is a specified location, for example the current location of the LAD or another location specified by a user. Another example of a location of interest is a location of a landmark, such as an airport, restaurant, gas station, etc. Another example of a location of interest is the location of a friend or associate, for example a friend or associate with a LAD that is capable of transmitting its location. Another example of a location of interest is a location specific to the user of an LAD, for example a location corresponding to an address in an electronic address book or a previously visited location. Another example of a location of interest is a time series of locations, for example locations at which a user has skied during a day at a ski area. In some embodiments, a location of interest may be correlated to a distorted map using one or more control points such as tiepoints, for example using "image registration" spatial transformations such as those described in Gonzalez and Woods, "Digital Image Processing" (ISBN 0-201-50803-6), p. 298-302, which is incorporated herein by reference for all purposes.

In an example in which a distorted map is associated with tiepoints that provide correlation between physical locations and coordinates on a distorted map image, each tiepoint may, for example, consist of an (x,y) coordinate denoting a physical location (for example, latitude and longitude) and an (x',y') coordinate denoting display coordinates on a distorted map. A point of interest may be correlated to the distorted map at a point on the display derived by interpolation of the display coordinates of nearby tiepoints. In one example of correlating a point of interest, the X location at which a user's location should be displayed may be linearly interpolated from the X display coordinates of the two tiepoints whose locations are nearest the user on the X axis in the negative and positive directions, and the Y location at which the user's location should be displayed may be linearly interpolated from the Y display coordinates of the two tiepoints whose locations are nearest the user on the Y axis in the positive and negative directions.

In another example of correlating a point of interest, three tiepoints forming a triangle containing or near to the location of interest (x1,y1) . . . (x3,y3), with corresponding display coordinates (x1', y1') . . . (x3',y3'), may be selected from among the tiepoints. An example of selecting three tiepoints is to select tiepoints near to the point of interest that specify a triangle containing the point of interest. The display coordinates (x',y') of the user's physical location (x,y) may be calculated relative to the tiepoints forming a nearby or enclosing triangle. An example of calculating the display coordinates (x',y') is to evaluate (with appropriate values of t1 . . . t6) the pair of affine equations:

$$x'=t1x+t2y+t3$$

$$y'=t4x+t5y+t6.$$

The three pairs of tiepoint coordinates that specify the selected nearby or surrounding triangle can be substituted into the above two equations, creating six equations, with six unknowns (t1 . . . t6) all of which are linear in t1 . . . t6. Using techniques of linear algebra readily understood to those skilled in the art, the six linear equations with six unknowns may be solved for t1 . . . t6.

In another example of correlating a point of interest, four tiepoints forming a quadrilateral containing physical coordinates associated with the location of interest (x1,y1) . . . (x4,y4), with corresponding display coordinates (x1',y1') . . . (x4',y4'), may be selected from among the tiepoints. An example of selecting four tiepoints is to select tiepoints whose physical coordinates are closest to the point of interest to the upper left, upper right, lower left and lower right. In some embodiments, four tiepoints may be selected such that no three are collinear. Display coordinates (x',y') corresponding to the user's physical location (x,y) may be calculated relative to tiepoints forming an enclosing quadrilateral. An example of calculating the display coordinates (x',y') is to evaluate the pair of bilinear equations:

$$x'=c1x+c2y+c3xy+c4$$

$$y'=c5x+c6y+c7xy+c8.$$

The four pairs of tiepoint coordinates can be used to solve for the eight coefficients c1 . . . c8, which can then be substituted into these two equations to yield the location (x',y') at which the user's location should be displayed. Solving for the eight coefficients c1 . . . c8 is readily understood to those skilled in the art. An example of solving for c1 . . . c8 is to express the tiepoints using a matrix such as $$\begin{bmatrix} x'_1 \\ y'_1 \\ x'_2 \\ y'_2 \\ x'_3 \\ y'_3 \\ x'_4 \\ y'_4 \end{bmatrix} = \begin{bmatrix} x_1 & y_1 & x_1y_1 & 1 & 0 & 0 & 0 & 0 \\ 0 & 0 & 0 & 0 & x_1 & y_1 & x_1y_1 & 1 \\ x_2 & y_2 & x_2y_2 & 1 & 0 & 0 & 0 & 0 \\ 0 & 0 & 0 & 0 & x_2 & y_2 & x_2y_2 & 1 \\ x_3 & y_3 & x_3y_3 & 1 & 0 & 0 & 0 & 0 \\ 0 & 0 & 0 & 0 & x_3 & y_3 & x_3y_3 & 1 \\ x_4 & y_4 & x_4y_4 & 1 & 0 & 0 & 0 & 0 \\ 0 & 0 & 0 & 0 & x_4 & y_4 & x_4y_4 & 1 \end{bmatrix} \begin{bmatrix} c_1 \\ c_2 \\ c_3 \\ c_4 \\ c_5 \\ c_6 \\ c_7 \\ c_8 \end{bmatrix}.$$

In this example, which may be written as [X'Y']=[M][C], [C]=[M]$^{-1}$[X'Y']. Solving for [C], and therefore for c1 . . . c8, may be performed using common matrix operations readily understood by those skilled in the art. c1 . . . c8 may then be applied to the bilinear equations to solve for (x',y'). In other examples of correlating a point of interest, more than four tiepoints may be used with higher-level polynomials.

A distorted map may be displayed with one or more correlated locations of interest. An example of displaying a distorted map with a correlated location of interest is to display the map, and overlay a representation of the point of interest, for example an icon and/or text, at or near the correlated location that was calculated for the point of interest.

Figure 12:
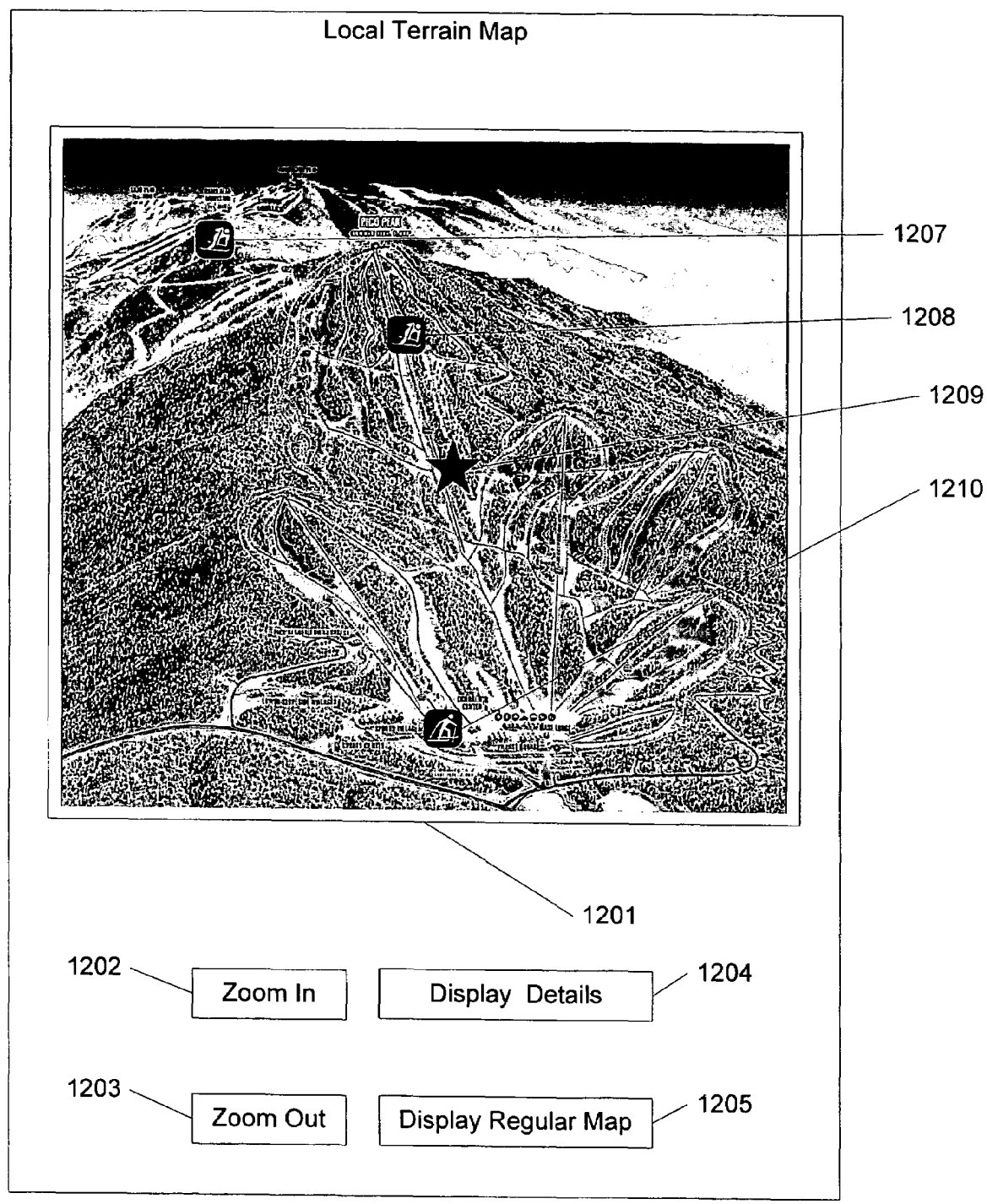
FIG. 12 is an illustrative diagram of a user interface for displaying a distorted map according to some embodiments.

FIG. 12 is an illustrative diagram of a user interface for displaying a distorted map according to some embodiments. An example of a situation in which this user interface could be displayed is when a distorted map including correlated locations of interest has been prepared, for example as discussed in conjunction with FIG. 11. In this example, a LAD is displaying a distorted map 1201 showing the location of a mobile communications device 1209 and the location of locations of interest 1207, 1208, 1210. In this example, the distorted map may have been downloaded from a ski area, as discussed in conjunction with 1102 of FIG. 11. In this example, the locations of interest 1207, 1208, 1210 are friends, for example as discussed in conjunction with FIG. 3, and the display coordinates of the friends have been correlated onto a distorted map, for example as discussed in conjunction with 1105 of FIG. 11. In this example, additional information associated with friends 1207, 1208, 1210 may be displayed by selecting a button 1204, and an undistorted map such as the standard built-in map may be displayed by selecting a button 1205. In this example, the map 1201 may be zoomed in or out using buttons 1202, 1203.

Figure 13:
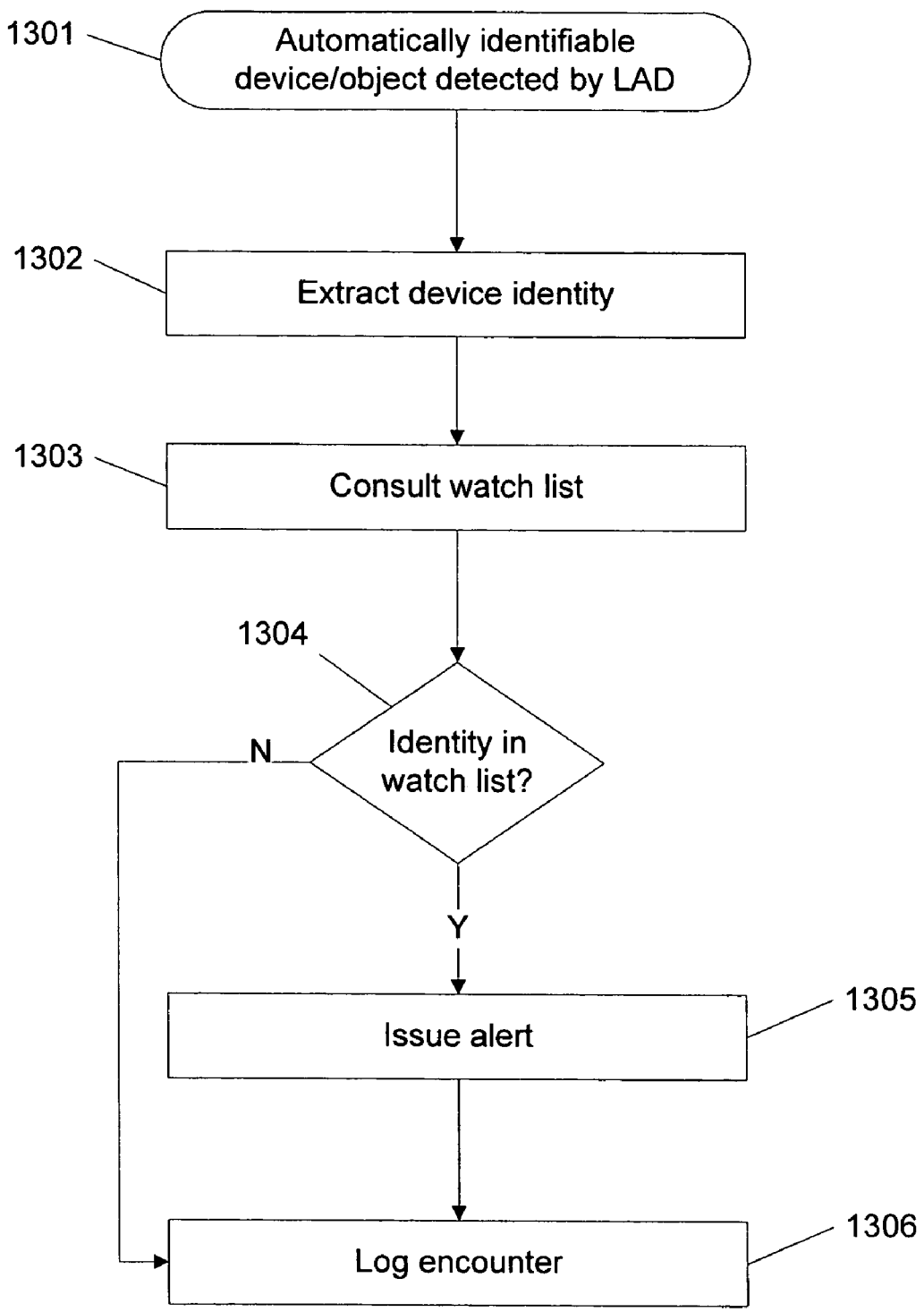
FIG. 13 is a flow diagram of a method for detecting nearby devices and/or objects from a mobile location-aware device according some embodiments.

FIG. 13 is a flow diagram of a method for detecting nearby devices and/or objects from a mobile location-aware device according some embodiments. In this example, an automatically identifiable device or object is detected by a LAD (1301). An example of a LAD capable of detecting an automatically identifiable device or object is a LAD integrated with or connected to a sensor such as an RFID scanner or a digital imaging device connected to an image recognizer. An example of a location-aware device integrated with or connected to a sensor is a police car equipped with a location aware device (for example deriving location awareness from a GPS receiver) and a sensor. Examples of detecting an automatically identifiable device or object include receiving RFID information and analyzing an image and determining that an identifiable object is contained within the image. In some embodiments, detection may be performed in an uncontrolled environment. An uncontrolled environment refers herein to any environment in which an encounter with identifiable items is not predictable, such as a street environment. A controlled environment refers herein to any environment in which an encounter with identifiable items is predictable, such as a laboratory, factory, vehicle fleet yard, toll gate, parking lot or warehouse.

A device identity may be extracted (1302). One example of extracting a device identity is to determine identifying information such as a product and serial number from electronic product code information in an RFID tag. Another example of extracting a device identity is to extract a license plate number from a digital image of a car. In some embodiments, a license plate may contain an embedded transmitter such as an RFID tag that can transmit its identity, for example its license plate number. In some embodiments, a vehicle may contain an embedded transmitter such as an RFID tag that can transmit its identity, for example its vehicle identification number. In some embodiments, an optional watch list may be consulted (1303). A watch list may contain items of interest, including for example license plate numbers of stolen cars or cars wanted in connection with a crime or criminal, identifiers associated with missing persons or objects, and serial numbers of objects reported stolen. If the object being identified is present on a watch list (1304), then an alert is issued in this example (1305). An example of issuing an alert is to alert a user to the fact a watch-listed item has been detected, for example by displaying the identity of the item, such as visually or audibly. Another example of issuing an alert is to transmit an alert to a remote location such as a server, for example over a network such as a wireless network, for example GPRS or 802.11.

If the identified item is not on a watch list (1304), including embodiments in which there is no watch list, then the encounter with the identified item is optionally logged in this example (1306). An example of logging the encounter is to record encounter information such as the identity of the item and the time and optionally the location that it was detected. Another example of logging the encounter is to transmit encounter information, for example to a server via a network such as a wireless network. In some embodiments, all encounters may be logged. In some embodiments, only encounters with items on a watch list may be logged.

In some embodiments, a logged encounter may be deleted after a particular time period such as two days has elapsed. In some embodiments, logged encounter data that is determined to be relevant may be retained for longer than data that is not determined to be relevant. An example of determining that an encounter is relevant is if a crime was committed in the vicinity of an encounter at a similar time (for example, within an hour of the encounter). Another example of determining that an encounter is relevant is if the encounter was an encounter with an item that is on the watch list, or is placed on a watch list before the encounter was to be deleted. Another example of determining that an encounter is relevant is if a user manually classifies an encounter as relevant, for example by determining that an encounter may be associated with an investigation.

In some embodiments, encounter data may be queried, for example to retrieve the license information of all cars detected within a particular area during a particular time period. In some embodiments, queries of encounter data may be performed by law enforcement personnel, for example for use in correlating crimes to vehicles.

In some embodiments, a LAD may be combined with an identification sensor and used in a non-interactive mode. An example of using a LAD combined with an identification sensor in non-interactive mode is to use it to log encounters (1306). In some embodiments, non-interactive logging may include transmitting an encounter, for example via a wireless network such as GPRS. In some embodiments, non-interactive logging may include storing an encounter for later transmission. Examples of the use of non-interactive logging include use in fixed location (non-mobile) installations, unmanned vehicles such as drones, and automobiles owned by volunteer citizens.

Figure 14:
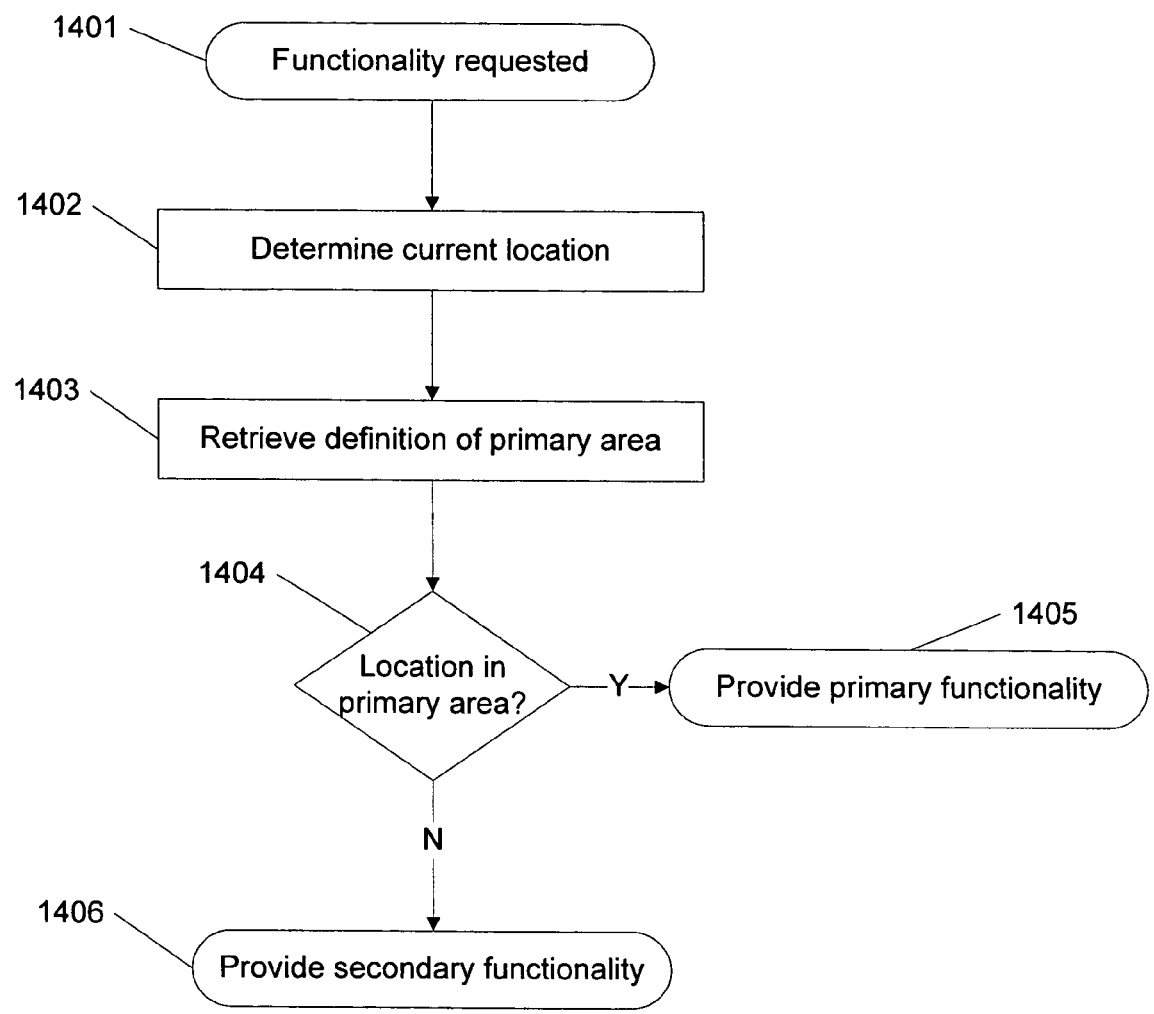
FIG. 14 is a flow diagram of a method for varying functionality based on location according to some embodiments.

FIG. 14 is a flow diagram of a method for varying functionality based on location according to some embodiments. In this example, functionality is requested (1401). Requesting functionality may include any attempt to use a LAD, such as turning it on or attempting to access content or programs. The current location of the device may be determined (1402). A primary area definition may be retrieved (1403). An example of a primary area definition is a region in which primary functionality may be provided, for example any functionality whatsoever. If the current location is within the primary area (1404), then primary functionality is provided in this example (1405). An example of providing primary functionality is to provide full functionality. Examples of providing full functionality include allowing a location-aware safe to be opened and allowing a location-aware multimedia player to play restricted content such as adult movies or songs with potentially obscene lyrics, and allowing a location-aware PocketPC to be used.

If the current location is not within the primary area (1404), then secondary functionality is provided in this example (1406). One example of providing secondary functionality is not to provide any functionality, or to provide severely limited functionality such as displaying an error message. Examples of providing no functionality or severely limited functionality include not allowing a safe to be opened and not allowing a PocketPC to be operated. Another example of providing secondary functionality is to provide restricted functionality, for example allowing only PG-rated movies or songs without potentially obscene content to be played by a multimedia player. In some embodiments, a primary operational area may include an irregularly shaped area, or multiple discontiguous areas. In some embodiments, there may be more than two different operational areas associated with different behaviors.

One example of an application of location-based functionality is a PocketPC used to take orders in a restaurant, which could contain a subroutine, for example inserted into its display driver, that can check its current location and disable the device, for example by disabling its display, if it is more than a threshold distance such as one mile from the location of the restaurant at which it has been programmed for use.

Another example of an application of location-based functionality is an anti-theft safe that can open when the correct combination was entered, only if it was within a specific distance (for example, 100 meters) of a primary location at which it was programmed to be opened. Such anti-theft safes may for example be used in mobile commerce scenarios such as taxis and armored cars, where items of value, such as cash, may be inserted into the safe anywhere, but extractions can only be made, or can be made at an unrestricted rate, after the safe is opened near its primary location. An example of setting a primary location for a device such as a safe is pressing and holding a button in the interior of the device, for example a button labeled "HOME," when it is in that location, causing the current location to be stored as the location near which it should subsequently provide primary functionality.

Another example of location-based functionality is for personal computer software containing encryption technology to use strong encryption techniques if operating on a computer within the United States, and weaker, export-legal encryption techniques if it was operating on a computer outside the United States, based on its actual location.

Another example of location-based functionality is to authorize a device capable of playing or displaying media content to allow specific content only within certain areas (for example, within a circle with a radius of ten feet, centered at a specific location). For example, only children's content might be viewable in a child's bedroom, only films rated PG-13 or below might be displayable in the living room without a parental password, and adult content might be displayable only in the parents' bedroom. Such locations could, for example, be set by a user selecting a UI element titled "Allowed here" while at a location he or she wishes to control, entering an administrative password, and selecting the categories of allowed material for the current location. In this example, restrictions may for example be enforced when a request is made to obtain a listing of the available material by checking to see if the current location is within a controlled area, and if so, presenting only categories of material allowed in that location. In some embodiments, media playing software may check at regular intervals (for example, every ten seconds) to verify that its current location allows the playing of the media type currently being played, and may pause or stop playback if the content being played is not permitted in the current location. In some embodiments, resumption of playback may be permitted if an administrative password is entered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for logging encountered items encountered by a mobile device, comprising:
   automatically detecting an item;
   wherein detecting the item occurs in an uncontrolled environment;
   extracting an identity;
   wherein the identity is associated with the item;
   logging an encounter;
   wherein the encounter includes the identity; and
   deleting the encounter after a predetermined period of time has elapsed, wherein the encounter is not marked as relevant.

2. The method of claim 1, wherein the item is a license plate.

3. The method of claim 1, further comprising determining whether the identity is contained in a watch list.

4. The method of claim 3, further comprising alerting a user, if it is determined that the identity is contained in the watch list.

5. The method of claim 3, further comprising transmitting an alert, if it is determined that the identity is contained on the watch list.

6. The method of claim 1, further comprising marking an entry as relevant.

7. The method of claim 1, wherein detecting the item includes receiving information associated with an RFID tag.

8. The method of claim 1, wherein extracting the identity includes analyzing an image.

* * * * *